United States Patent

[11] 3,601,156

| [72] | Inventor | William C. Hookway, Jr. |
| | | 5 Catalpa, Convent Station, N.J. 07961 |
| [21] | Appl. No. | 34,020 |
| [22] | Filed | May 4, 1970 |
| [45] | Patented | Aug. 24, 1971 |

[54] FLUID CONTROL VALVE
11 Claims, 5 Drawing Figs.

[52] U.S. Cl. .................................................... 137/630.14,
251/215, 251/228
[51] Int. Cl. ..................................................... F16k 31/52,
F16k 1/16
[50] Field of Search ........................................... 137/630.14,
630.15; 251/215, 218, 228

[56] References Cited
UNITED STATES PATENTS

| 929,007 | 7/1909 | Phillips ........................ | 137/630.14 |
| 2,208,281 | 7/1940 | Sharp et al. ................... | 137/630.14 |
| 3,402,740 | 9/1968 | Perolo ........................ | 137/630.14 |

Primary Examiner—Robert G. Nilson
Attorney—Roderick B. Anderson

ABSTRACT: An in-line fluid control valve for use over a wide range of fluid flow rate and fluid pressure requirements. The valve includes a movable main valve member having a spherically shaped segment. In operation, the main member simultaneously translates and rotates while being guided within a cylindrical cage formed by the inner faces of a plurality of riblike members interposed between the outer valve casing and the main valve member and disposed longitudinally with respect to the flow axis. Simple actuating linkage includes a clevis pivotally coupled to the main valve member or to a piston which extends through a cylindrical cavity in the main valve member to provide a pilot valve for facilitating opening and closing the valve under relatively high fluid differential pressure conditions.

3,601,156

INVENTOR
WILLIAM C. HOOKWAY JR.
BY
*Roderick B. Anderson*
ATTORNEY 3,601,156

FLUID CONTROL VALVE

BACKGROUND OF THE INVENTION

This invention relates to valves for controlling the flow of fluids in piping systems; and, more particularly, to a simplified, yet improved, in-line valve suitable for use over a wide range of fluid flow rate and fluid pressure requirements.

Inasmuch as the valve art extends from time immemorial, and since a wide variety of fluid control problems have been experienced, the art is replete with a correspondingly wide variety of general and special purpose valves. Not surprisingly, by analogy to other mechanical arts, ingenious inventors have gone to extreme ends in devising complex valves including, inter alia: Springs, pluralities of pairs of linkages and counterlinkages; flexible members subject to fatigue; and highly stressed parts. Naturally, the fabrication and maintenance of such apparatus is costly; and a less expensive valve offering comparable performance is always in demand.

SUMMARY OF THE INVENTION

Accordingly, a primary object of my invention is an in-line valve offering compactness and simplicity of manufacture and yet being suitable for use over a wide range of fluid flow rate and fluid pressure requirements.

Consistent with the aforementioned and other objects, an in-line valve in accordance with one embodiment of my invention includes a novel combination of a relatively few simple machinable or cast parts synergistically coacting to offer at least the following features and operating characteristics:

1. positive frustoconical seating and the capability for using a metallic or nonmetallic seat which may, but need not be, integral with the valve casing;
2. a main valve member having a spherically shaped segment coacting with the frustoconical seat and disposed within a cylindrical cage which guides axial and rotary movement of the valve member during the operating cycle, thereby eliminating complex linkage and long guides otherwise needed;
3. simple actuating means including a pair of pivotally connected arms, one of which is coupled to the valve member and the other of which is fixedly attached to a shaft, rotation of which shaft causes the valve disc simultaneously to translate axially and to rotate from or toward the seat;
4. continuous control of rate of flow;
5. minimal turbulence; and
6. low pressure drop in the open position.

For higher pressure applications a valve in accordance with a second embodiment of my invention includes the aforementioned features and characteristics and additionally includes a pilot valve disposed within the main valve disc and operated by actuating linkage common therewith. Initial movement of the actuator opens the pilot valve to reduce the differential pressure across the main valve member. Further movement of the actuator opens the main valve by moving the main valve member away from its seat, relatively little force being required because of the pilot valve pressure relief.

Another advantageous feature of the second embodiment is that under upstream fluid pressure the pilot valve remains open until after the main valve has been closed. This pressure relief during the closure cycle helps to prevent the main valve from slamming shut with attendant deleterious effects on all parts, especially the seat and the main valve member.

BRIEF DESCRIPTION OF THE DRAWING

The aforementioned and other objects, features, and advantages of my invention will become more apparent and the invention will be better understood from a consideration of the following more detailed description taken in conjunction with the accompanying drawing in which.

Figure 1:
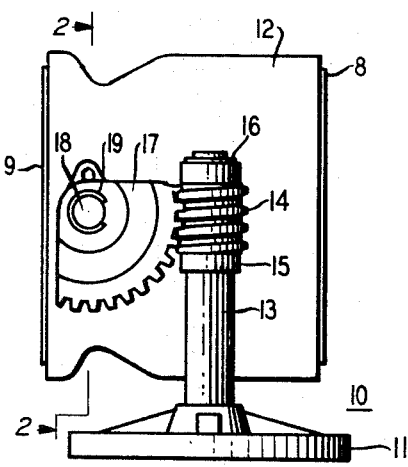
FIG. 1 is a plan view of a valve in accordance with an illustrative embodiment of the invention, illustrating one form of external means for actuating the valve.
Figure 2:
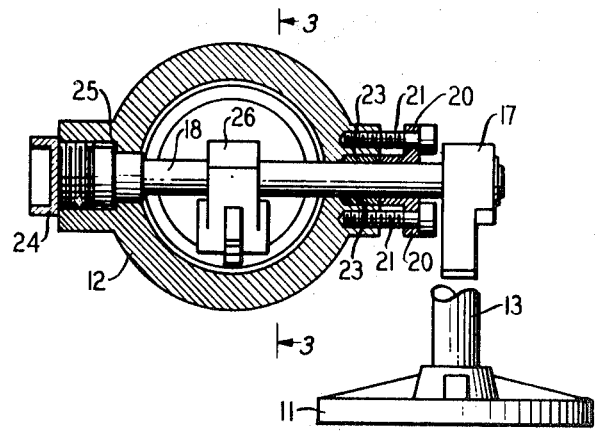
FIG. 2 is a cross-sectional view transverse to the flow axis through a valve in accordance with an embodiment of my invention and taken on lines 2—2 in FIG. 1.
Figure 3:
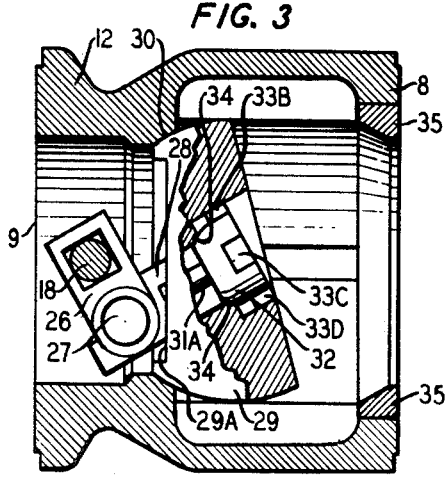
FIG. 3 is a cross-sectional view longitudinal with the flow axis through a closed valve in accordance with an embodiment of my invention and taken along lines 3—3 in FIG. 2.
Figure 4:
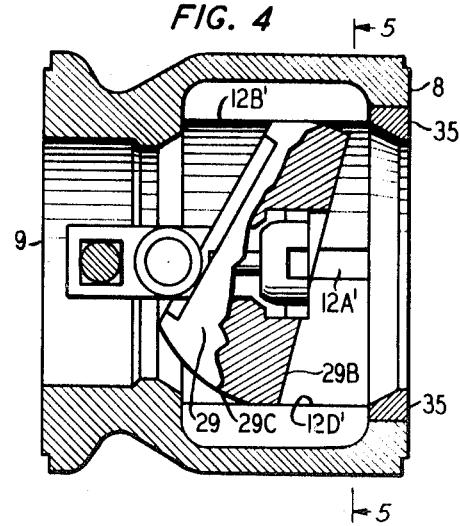
FIG. 4 shows the same view as FIG. 3, except that in FIG. 4 the valve is shown in the open position.
Figure 5:
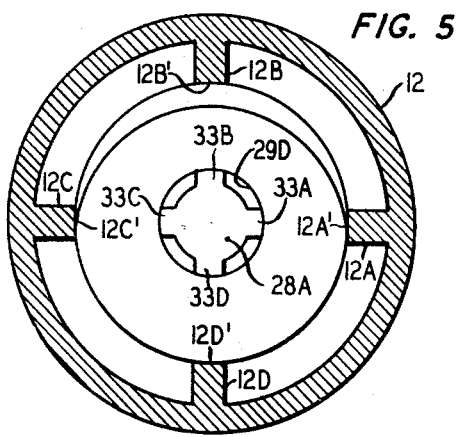
FIG. 5 is a cross-sectional view transverse to the flow axis through the open valve of FIG. 4 and taken along lines 5—5 in FIG. 4.

It will be appreciated that for economy of illustration and clarity of explanation, FIGS. 3–5 have been drawn to a larger scale than FIGS. 1 and 2.

DETAILED DESCRIPTION

Referring now in detail to the drawing, FIG. 1 shows a plan view of a valve 10 in accordance with an illustrative embodiment of my invention. Valve 10 includes a hollow casing 12 having an inlet port 8 and an outlet port 9 which may be provided with threads, flanges, or other means well known for connecting to upstream and downstream piping, respectively. Alternatively, this type of valve need not include integral flanges and/or threads, but may be secured, e.g., with bolts, between a pair of upstream and downstream line flanges, thereby reducing the weight and cost of the valve itself.

For purposes of illustration only, there is shown in FIG. 1 a handwheel 11 connected to a worm shaft 13 on which there is fastened a worm 14 by way of bracket 15 and retaining ring 16 and a key in a slot in shaft 13, the key and slot not being shown in the figure. Worm 14 engages a gear 17 which in turn is fixably attached, e.g., by a slot-key arrangement, to a main actuating drive shaft 18 and is held in place by a retaining ring 19. The valve is actuated open or closed by rotation of shaft 18 about its longitudinal axis, which in turn is effected by rotating handwheel 11. Although a handwheel, worm, and gear arrangement has been shown, it will be apparent that other mechanical and/or electromechanical manual or automatic actuators may as well be used, as desired.

Referring now to FIG. 2, there is shown a cross section taken transverse to the flow axis along lines 2—2 in FIG. 1. As shown, the main shaft 18 extends transversely through the valve, being rotatably secured to opposite sides of the valve casing 12. At the top of the valve, a gland 20 and gland bolts 21 and 22, with some suitable packing 23, are used to prevent fluid leakage along the shaft.

At its other end, shaft 18 is held in place by a shoulder on the shaft and a shaft-retaining, threaded stud 24 and an antifriction washer 25.

Also shown in FIG. 2 is a clevis 26 fixedly attached to main shaft 18, e.g., by a slot-key arrangement or by a square aperture in the clevis registered with and mounted on a corresponding locally square cross section of shaft 18, so that rotation of shaft 18 about its longitudinal axis causes a corresponding movement of clevis 26 to effect opening and closing the valve, as described in more detail with reference to FIGS. 3–5.

With specific reference now to FIG. 3 there is shown a cross-sectional view longitudinal with the flow axis taken along lines 3—3 in FIG. 2. As shown, the clevis 26 is pivotally coupled by a clevis pin 27 to a piston 28 which extends from clevis pin 27 through a cylindrical cavity of varying cross section in a main valve disc 29. Advantageously, the center line of piston 28 passes through the center of main disc 29. A frustoconical seat 30 is shown integral with the outer casing 12 and is disposed to coact with a spherical segment of main disc 29 to provide a positive fluid seal when in contact therewith. It will be appreciated that seat 30 may be metallic and integral with the casing, as shown, for simplicity of manufacture. However, seat 30 may as well be a metallic or nonmetallic, e.g., Teflon, seat detachably mounted within the casing for enabling replacement of the seat should maintenance be required. A ring 35, detachably connected to the casing, is used to permit the main valve member 29 to be placed into and/or removed from the valve casing; and, additionally is shaped to provide a diameter adapting interface between the inner diameter of the valve and the inner diameter of an upstream piping member with which the valve is to be connected.

With more specific reference now to piston 28, for relatively high differential pressure applications, this piston advantageously is adapted to provide a pilot valve which opens before main valve disc 29, thereby reducing the pressure differential across main disc 29 and thereby reducing the force required to move main disc 29 away from its seat 30. To this end, piston 28 may be of rectangular cross section where it is pivotally connected to clevis 26, and a portion of piston 28 which extends through the cylindrical cavity in disc 29 advantageously is a rectangular solid having fins, e.g., 31A, thereon, the locus of the outer points of the rectangle and the fins defining a geometry corresponding approximately to the geometry of the wall of the cylindrical cavity so as to allow smooth sliding motion therebetween. The further upstream portion of piston 28 advantageously is a solid cylinder 32 of larger cross section than the downstream portion and includes fins 33 therearound, to enable smooth sliding motion between that portion of piston 28 and the wall of the cylindrical cavity thereadjacent. Additionally, there is advantageously provided a spherically shaped segment of cylinder 32 for coacting with a frustoconical seat 34, shown integral with the main valve disc 29, for providing a suitable seating arrangement for the pilot valve.

Still with reference to FIG. 3, in operation, a counterclockwise rotation of shaft 18 causes the clevis to push piston 28 upstream (toward inlet port 8), thereby unseating the pilot valve and allowing fluid to flow along the finned portions within the cylindrical cavity in main valve disc 29. As this motion proceeds, clevis 26 and piston 28 rotate about the longitudinal axis of clevis pin 27; and the rounded upstream face of clevis 26 approaches the downstream face 29A of main valve disc 29. Once the clevis contacts face 29A, further counterclockwise rotation of shaft 18 causes the clevis to push against face 29A, thereby unseating main valve disc 29 from its seat 30. Inasmuch as the contact between the clevis and face 29A is linear and offcenter, rotation (spinning) of main valve member 29 with respect to piston 28 thereby is prevented.

Referring now to FIG. 4, there is shown the view of FIG. 3 but with the valve in the fully open position. FIG. 5, a view taken along lines 5—5 of FIG. 4, will be described concurrently with FIG. 4 for simplicity and clarity of explanation.

Inasmuch as piston 28 is adapted for sliding smoothly within main disc 29, and inasmuch as clevis 26 and piston 28 rotate about clevis pin 27 as the valve is opened, the main valve disc 29 rotates about a translating axis transverse to the flow axis and simultaneously translates longitudinally with the flow axis as the valve is opened and/or closed. This is readily seen by comparing the relative positions of disc 29 as it appears in FIGS. 3 and 4. This simultaneous rotation and translation of disc 29 during valve opening and/or closing is guided smoothly by the inner faces 12A'—12D' of a plurality of riblike members 12A—12D, shown most clearly in FIG. 5, fixably attached to valve casing 12, or alternatively to ring 35, and disposed parallel to the flow axis.

As shown, the inner faces of these riblike members define a cylindrical "cage" within which main valve disc 29 simultaneously translates and rotates. Consequently, it will be apparent that the diameter of the cylindrical "cage" defined by faces 12A'—12D' should be substantially the same as the outer diameter of main disc 29 to ensure the smooth and uniform translating and rotating action desired of disc 29. This relative sizing is shown in FIGS. 3–5 by indicating the outer spherical face 29C of disc 29 in actual contact with the inner faces 12A'—12D' of the riblike members.

To close the valve and thereby shut off the flow of fluid from inlet port 8 to outlet port 9, handwheel 11 is turned so as to cause a clockwise rotation of shaft 18 (FIGS. 3 and 4) about its longitudinal axis. This rotation pulls piston 28 downstream. However, if sufficient upstream flow is present, the force exerted by the fluid upon the upstream face 29B of main valve disc 29 tends to force the main disc 29 to close so that the downstream face 29A of disc 29 remains in contact with the rounded upstream face of clevis 26 until disc 29 has retracted into contact with its seat 30. Thereafter, further clockwise rotation of shaft 18 disengages the clevis from face 29A and pulls the pilot valve closed, thereby shutting off all fluid flow. It will be apparent that in this mode of operation, under relatively high upstream pressure conditions, the main valve closes before the pilot valve so that the pilot valve provides pressure relief which helps to prevent the main valve from slamming shut with possible attendant deleterious effects on all parts, especially the main seat 30 and the main valve disc 29. In the absence of such sufficient upstream flow, piston 28 will first pull the pilot valve closed, i.e., pilot valve member 32 would be pulled into contact with pilot valve seat 34, and then the main valve disc 29 would be retracted into engagement with its seat 30 in response to further clockwise rotation of drive shaft 18.

The synergistic coaction of a cylindrical cage guiding a main valve disc having a spherically shaped segment which simultaneously translates and rotates when actuated by simple linkage in accordance with my invention are considered very important features of my invention. It will be appreciated that the plurality of riblike members may be as few as three and as many as desired; and, further, that these members may, but need not be, fabricated integrally with the outer casing 12, as shown for purposes of illustration in FIG. 5. However, where the members are formed integrally with the outer casing 12 in a casting operation, I presently prefer using four riblike members 12A—12D as shown in the figures.

Still further, if desired, the inner faces 12A'—12D' of the riblike members need not be metallic, but may be coated with a material such as Teflon, molybdenum disulfide, or other suitable material to provide smoother operation, although this will usually not need to be resorted to because of the inherently smooth, chatter-free operation of the valve operating as hereinbefore described. Similarly, if desired, the spherically shaped face of main valve member 29 may also be coated with a nonmetallic material for some applications to facilitate the desired seating and sliding action.

It now will be apparent that the main fluid flow through my valve is through the annularlike voids between members 12A—12D and around the main disc valve 29. Similarly, it will be apparent that the lesser fluid flow through the pilot valve is between the fins disposed around piston 28 as hereinbefore described. This is shown in more detail in FIG. 5 where: feature 29D represents the wall of the cylindrical cavity at the upstream face 29B (FIG. 4) of main disc 29; and feature 28A represents the upstream face of piston 28, including four fins 33A–33D. Of course, fewer or greater than four fins 33 may be used, as desired; and fins 33 and the other fins downstream therefrom around piston 28 need not be integral with piston 28, although they are shown integral and are so preferred for simplicity of fabricating, e.g., casting, piston 28. Also, of course, piston 28 need not be one solid piece but may include a plurality of series-connected portions.

Thus far there has been described a valve in accordance with my invention which includes a pilot valve advantageously for operation at relatively high fluid differential pressures. My invention, however, is not to be so limited. For applications involving lower pressure operation, for example below about 300 p.s.i. with a 2-inch spherical main valve disc, the pilot valve feature need not be used, if so desired. In this case, piston 28 would be integral with or fixably attached to the downstream face of a valve member having a spherically shaped segment like disc 29, except that the cylindrical cavity in the valve disc could then be omitted. Of course, the other particularly advantageous features of my invention including the cylindrical cage for guiding the main valve disc which simultaneously translates and rotates when actuated with the simple linkage in accordance with my invention would still be retained.

Although my invention has been described in part by making detailed reference to certain specific embodiments, such detail is intended to be and will be understood to be instructive rather than restrictive. It will be appreciated by those in the art that many variations may be made in the structure of the apparatus without departing from the spirit and scope of my invention as disclosed in the teachings contained herein.

For example, certain features of my invention may be used to advantage for some applications without a corresponding use of other features such as, for example, the use of the main valve without a pilot valve.

Further, it will be understood that the linkage means connecting the drive shaft to the valve disc need not be exactly as described, but may include any suitable arrangement of two or more pivotally connected arms arranged to cause the valve disc to translate longitudinally with the flow axis while being guided by the riblike members forming the cylindrical cage. Alternatively, of course, the drive shaft could include an eccentric portion or eccentric means fixably attached to the drive shaft, in which case only a single rigid arm would need be connected between the shaft and the valve disc for causing the valve disc to translate longitudinally to the flow axis while being guided by the riblike members forming the cylindrical cage.

Still further, it will be appreciated that the upstream and downstream faces of the valve disc need not be flat, but may be streamline-contoured as desired for adjusting turbulence.

Still further, it will be appreciated that the shaft and linkage means may be disposed upstream from the valve disc which in turn could then still be disposed upstream from the seat to retain the positive seating feature.

Still further, it will be appreciated that the main valve disc need not be pushed from behind by the clevis as shown in the figures but that the upstream face of the main valve may include a plate against which an upstream portion of the pilot valve piston pushes after the pilot valve is open.

What I claim is:

1. An in-line valve for controlling the flow of fluids comprising:
   a cylindrical casing having inlet and outlet ports, a flow axis being defined therethrough;
   a plurality of riblike members immovably disposed inside the casing such that said members extend longitudinally with respect to the flow axis, the inner faces of said members defining a hollow cylindrical cage of substantially circular cross section;
   a movable main valve member having a spherically shaped segment disposed between said inlet and outlet ports and within said cage, the diameter of the spherical segment being approximately equal to the diameter of the cage for enabling smooth sliding motion between the valve member and the inner faces of the riblike members;
   a frustoconical seat member fixably attached to the inside of the casing and disposed so as to coact with the valve member to provide a fluid seal when the spherical segment of the valve member is in contact therewith;
   a drive shaft extending through said casing, the longitudinal axis of the shaft being substantially transverse to the flow axis;
   means connected to said shaft for causing said shaft to rotate about its longitudinal axis; and
   linkage means connected between said shaft and said valve member for causing said valve member to translate away from said seat in response to a rotation of said shaft, the translation of the valve member being guided in substantially straight line motion longitudinally with the flow axis by the cylindrical cage.

2. Apparatus as recited in claim 1 wherein the linkage means includes means for causing said valve member simultaneously to translate and to rotate about an axis transverse to the flow axis away from said seat in response to a rotation of the drive shaft.

3. Apparatus as recited in claim 2 additionally comprising:
   a pilot valve disposed within the main valve member and actuated by the linkage means.

4. Apparatus as recited in claim 3 wherein the linkage means includes means in response to rotation of said drive shaft for opening the pilot valve before the valve member is caused to move away from the frustoconical seat.

5. Apparatus as recited in claim 2 wherein the linkage means comprises:
   a first arm, one end of which is fixably attached to said drive shaft; and
   a second arm, one end of which is pivotally connected to the other end of the first arm, and the other end of which is coupled to said valve member;
   said first and second arms and said valve member being so arranged that rotation of the drive shaft about its longitudinal axis simultaneously causes rotation of the arms about the pivotal axis and translation of the valve member along the flow axis and rotation of the valve member about an axis transverse to the flow axis.

6. Apparatus as recited in claim 5 wherein:
   the valve member includes a cylindrical cavity of varying cross section extending therethrough in a direction between the inlet and outlet ports; and
   a portion of the second arm adjacent its other end is a solid cylinder of varying cross section having fins disposed thereon, the outer perimeter of said fins corresponding approximately to the shape of the wall of the cylindrical cavity in said valve member, for guiding the second arm through the cylindrical cavity in smooth sliding motion.

7. Apparatus as recited in claim 6 wherein a portion of the wall of the cylindrical cavity is shaped in the form of a second seat and a corresponding portion of the second arm is shaped in the form of a pilot valve member registered with the second seat so that a fluid seal is provided when the pilot valve member engages the second seat.

8. Apparatus as recited in claim 7 wherein:
   the second seat is frustoconical in shape; and
   the pilot valve member portion of the second arm adapted for engagement with the second seat is in the shape of a substantially spherical segment.

9. Apparatus as recited in claim 7 wherein the first and second linkage arms are arranged so that initial rotation of the arms about the pivotal axis in response to initial rotation of the drive shaft about its longitudinal axis causes the second arm to translate along the axis of the cylindrical cavity, thereby opening the pilot valve; and so that further rotation of the arms about the pivotal axis in response to further rotation of the drive shaft causes a portion of one of the arms first to engage a portion of the valve member and thereafter to push the valve member away from its seat.

10. Apparatus as recited in claim 7 wherein:
    the first arm includes a clevis, one end of which is fixably attached to the drive shaft and the other end of which is rounded and is pivotally connected to the second arm;
    the relative lengths and sizes of the clevis and the second arm being such that initial rotation of the drive shaft first causes the pilot valve to open, and further rotation causes the rounded portion to engage the closest face of the main valve member, and still further rotation of the drive shaft causes the clevis to push the main valve member away from its seat.

11. Apparatus as recited in claim 9 wherein the other end of the second arm engages a portion of the face of main valve member opposite the linkage and pushes thereagainst in response to said further rotation.